United States Patent [19]

Hogan

[11] 3,801,957

[45] Apr. 2, 1974

[54] AUTOMATIC TIRE CODE READER

[75] Inventor: James J. Hogan, Akron, Ohio

[73] Assignee: The Goodyear Tire & Rubber Company, Akron, Ohio

[22] Filed: Aug. 14, 1972

[21] Appl. No.: 280,290

[52] U.S. Cl...... 340/146.3 F, 178/6.8, 340/146.3 Q

[51] Int. Cl............................................ G06k 9/08

[58] Field of Search...............340/146.3 F, 146.3 Q, 146.3 G, 340/149, 146.3 R; 178/6.8; 315/10, 11, 12; 235/181

[56] References Cited

UNITED STATES PATENTS

| | | | |
|---|---|---|---|
| 3,564,126 | 2/1971 | Koch et al. | 178/6.8 |
| 3,335,284 | 8/1967 | Parks | 340/146.3 F |
| 3,476,197 | 11/1969 | Penix et al. | 178/6.8 |

*Primary Examiner*—Paul J. Henon
*Assistant Examiner*—Leo H. Boudreau
*Attorney, Agent, or Firm*—F. W. Brunner; L. A. Germain; J. G. Pere

[57] ABSTRACT

Disclosed is an automatic code reading system capable of automatically reading and formating for further use the identifying code contained on a particular item. The system is capable of ascertaining the identity of codes which are readily ascertainable by view of the human eye. Basically the invention teaches the use of a magnetically focused and deflectable electronic image storage tube to receive the image of the identifying code and compare that image with known images so as to effect an output of the image storage tube which will be indicative of the character of the code. The invention further provides a means for receiving the output of the image storage tube and converting that output into a format which may be readily used by peripheral equipment. Particularly, the invention teaches a digital output equivalent of the identifying code.

11 Claims, 5 Drawing Figures

Figure 3:
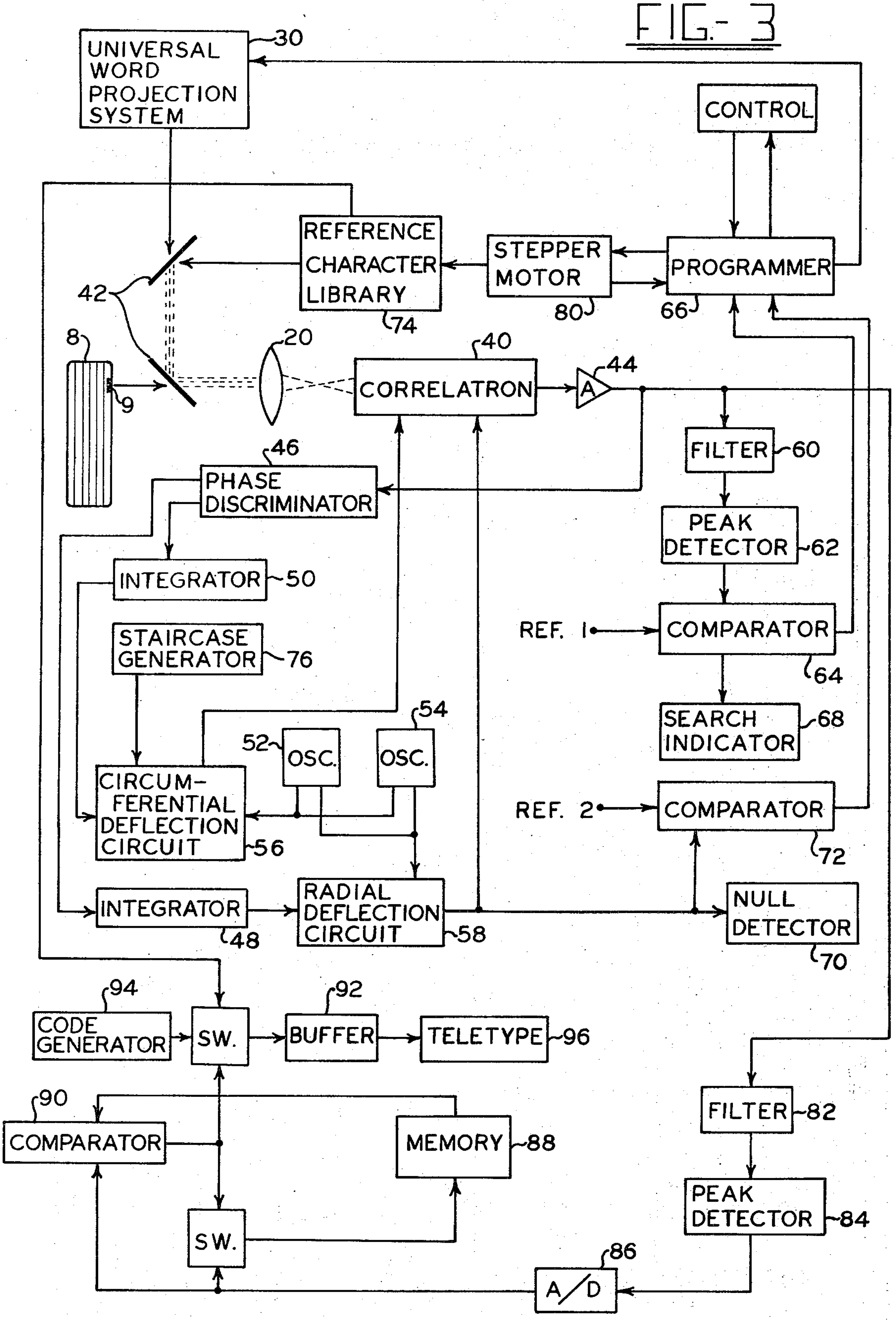

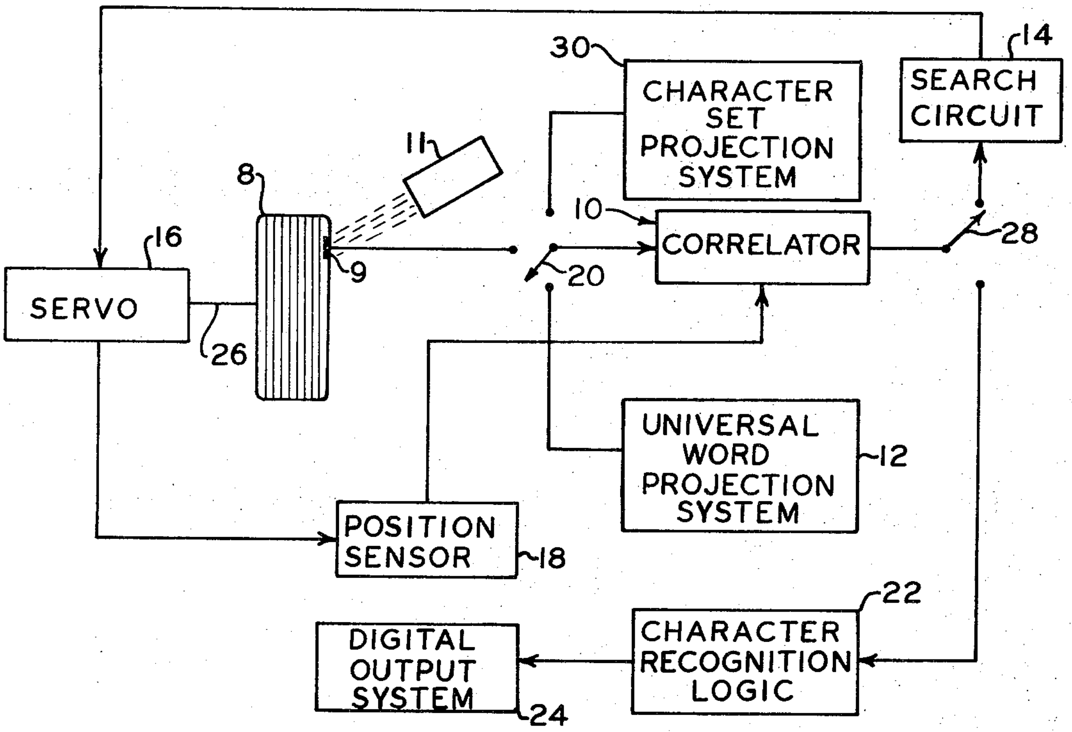
FIG.-1
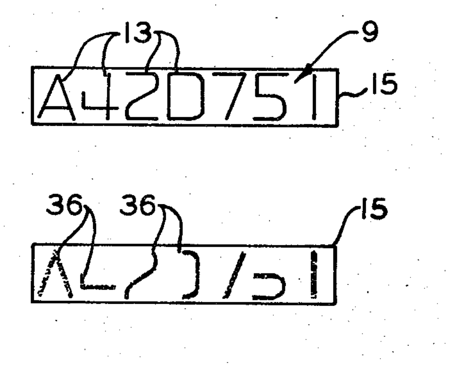
FIG.-2a
FIG.-2b
FIG.-2

AUTOMATIC TIRE CODE READER

The need has become apparent in numerous industries for a system whereby the various identifying codes, or serial numbers, of production line products may be automatically read and prepared for any one of various uses. A particular need has arisen in the tire industry for automatically reading and recognizing the tire codes molded into each production tire. It is particularly desirable that these tire codes be read and correlated with the other identifying codes of the various components of the automobile upon which they will finally be placed. A system is therefore necessary which may automatically read a tire code from a tire and convert that code into such a format that the tire code may then be accepted by peripheral equipment wherein the tire code will be correlated with the various other codes of the component products comprising the automobile.

Several characteristics of tire codes make them attractive for automatic reading; namely, they have a constant and uniform cast, their spacing is uniform, and they are placed in a linear format. Some of the less desirable characteristics are that they have a generally poor contrast, their location on the tire is only approximately known, and the tires vary in size and shape.

Heretofore, the most common approach to code recognition has been to change the coding procedure to adapt to conventional code readers, such as binary magnetic or optical sensors. However, such approaches suffer from three inherent deficiencies: the cost of coding the item is higher than using the standard molding method, and the inscription is less permanent; the codes cannot be readily read by humans; and errors in coding are difficult to identify.

A far better approach to automatic code reading is to present a system comprising a sensor and processor whereby alpha numeric characters may be readily recognized. Such a system would require a minimum amount of modification in present coding procedures and would allow the use of a common code readily ascertainable from view by the human eye.

It is therefore the object of the instant invention to present a code reading system which may readily ascertain and code for further use the identifying code on any particular item.

It is the further object of the invention to present a code reading system which is capable of reading and formating codes comprised of alpha numeric characters which are readily ascertainable by view of the human eye.

Still a further object of the invention is to present a code reading system of such character that it may readily determine the identity of a code having poor contrast with the item on which it is contained, and having slight variations and malformaties therein.

Yet a further object of the instant invention is to present an automatic tire code reading system which is accurate in operation, rapid in processing time, inexpensive to build, and readily adaptable to use in an assembly line environment.

The above objects and other objects which will become apparent as the description proceeds are achieved by apparatus comprising; an image storage tube and control circuitry associated therewith providing a means of sensing, storing, and comparing opitcal images; an optical means of projecting optical images into the image tube; a universal word projection system providing the means to reflect an image of universal word through the optical means and upon the image storage tube such that the particular code of a given item may be aligned therewith; a reference character set projection system providing a means to reflect the image of each of a plurality of reference characters upon the image storage tube so as to affect an output of the image storage tube which is a function of the correlation between the reference character and the individual characters of the particular code; and a means to receive, store and update the outputs of the image storage tube such that when any character of the particular code has been correlated with each of the characters of the reference character set projection system the identity of that character is determined and contained therein.

For a more complete understanding of the invention and the advantages and objects thereof, reference should be had to the following specification and the accompanying drawings wherein there is shown a preferred embodiment of the invention.

In the drawing:

FIG. 1 illustrates a general block diagram of the system comprising the instant invention;

FIG. 2, comprising FIGS. *2a* and *2b*, illustrates a typical alpha numeric tire code and a typical universal word respectfully; and

FIG. 3, is a schematic diagram of the apparatus of the instant invention.

By referring now to the drawings and more particularly FIG. 1 a basic understanding of the general operation of the instant invention may be had. Here it may be seen that the heart of the system is a correlator 10 comprising a magnetically focused and deflectable image storage tube, which will be more fully described hereinafter, and the control circuitry associated therewith. It should be noted that the correlator 10 may receive inputs from any of three sources and its outputs may effect the operation of either of two particular circuits.

While discussion shall be limited to the determination of a tire code, it should be understood that the concepts of the invention are readily applicable to the determination of any of numerous types of codes on any of numerous types of products.

Fundamentally, the instant invention teaches three particular steps in determining a tire code. To begin operation a tire 8 bearing a code 9 on the sidewall thereof is placed upon a spindle 26 which is made to rotate by control of the servo mechanism 16. The sidewall of the tire 8 is then illuminated by a light source such as the preferred collimnated light 11 so as to enhance the contrast of the physical features of the tire. In general, the code 9 may have any of various characteristics but for purposes of discussion, the code 9 will be assumed to be similar in nature to the code shown in FIG. *2a* which comprises a plurality of alpha numeric characters 13 within a suitable geometric enclosure 15. The alpha numeric characters 13 and the enclosure 15 may be either embossed or debossed on the sidewall of the tire. It should be noted that the alpha numeric characters 13 comprising the code 9 will in all instances be arranged in a particular pattern in relation both to each other and the geometric enclosure 15. In other words, the spacing of the alpha numeric characters 13 comprising the code 9 will, for all codes, be in the same pattern and the geometric enclosure 15 will always be of the same nature. It should also be noted that the code may be comprised of characters readily conceivable by the human eye such that the codes may be read by either the apparatus of the instant invention or a human being.

Now, with the tire 8 on the spindle 26, the lens 20 is placed to position 1. With the circuitry in this situation, the image storage tube of the correlator 10 may receive through the lens 20 the image of a universal word projected by the universal word projection system 12. This universal word, as shown in FIG. 2*b*, is quite similar in nature to the tire code 9 as shown in FIG. 2*a*. However, the universal word comprises a plurality of universal characters 36 positioned in exactly the same manner as the alpha numeric characters of the tire code 9 and enclosed in a like geometric enclosure 15. The universal characters 36 are not necessarily alpha numberic characters but are indicia of the alpha numeric characters 13 of a tire code 9. The image storage tube of the correlator 10 then stores the image of the universal word on a storage grid therein.

The lens 20 is then moved to position 2 whereby images from the sidewall of the tire 8 are reflected into the image storage tube of the correlator 10. The switch 28 is then positioned such that the output of the correlator 10 drives the input of the search circuit 14. At this point, the output of the search 14 controls the servo mechanism 16 so as to rotate the tire 8 about the spindle 26. As the tire 8 is so rotating, images from the sidewall thereof are reflected through the lens 20 along the optical path and into the image storage tube of the correlator 10. The images so reflected are compared or correlated with the image of the universal word which is then stored on the grid of the image storage tube. The output of the correlator 10 which at this point is driving the input of the search circuit 14 is directly related to the degree of correlation between the images reflected through the lens 20 and the image stored on the storage grid of the image storage tube. This output controls the operation of the search circuit 14 which through the servo mechanism 16, causes the tire 8 to rotate. Eventually, the tire code 9 on the sidewall of the tire 8 passes before the lens 20 and the image thereof is reflected into the image storage tube of the correlator 10. At this time there is a high degree of correlation between the reflected image and the stored image. The correlator 10 indicates this condition to the search circuit 14 which in turn controls the servo mechanism 16 such as to make one more complete revolution of 2 $\pi$ radians and then cease the rotation in such a manner that the tire comes to rest in a position where the tire code 9 is reflected through the lens 20 and onto the image of the universal word stored on the grid of the image storage tube with a high degree of correlation. At this point, the search circuit 14, by control of the servo mechanism 16, may cause the tire to alter its position the slight amount necessary to obtain the highest degree of correlation. When this match is made, the tire code 9 is then written onto the storage grid of the image storage tube of the correlator 10; that is, it replaces the universal word previously stored thereon.

With the image of the tire code 9 now stored on the grid of the image storage tube of the correlator 10 in exactly the same position as was the universal word, the third phase of the operation is now entered into. Here, the lens 20 is placed into position 3 such as to receive images from the character set projection system 30 and the switch 28 is placed in such a position that the output of the correlator 10 drives the input of the character recognition logic 22. The character set projection system 30 comprises a library of alpha numeric characters of exactly the same nature as those comprising the tire codes. At this time, the circuitry of the correlator 10 adjusts the image storage tube such that the electron image is deflected in the image storage tube and projected to the first character of the tire code. This type of control is well understood by those skilled in the art. The character set projection system 30 then begins to deal through its entire library, such that the images of the various characters of the library are reflected through the lens 20 and compared to the first character of the tire code which is stored on the storage grid of the image storage tube. The output of the correlator 10 reflects the degree of correlation between this first character of the tire code and the various characters in the library. The character recognition logic 22 is such that it consistently updates itself, storing the response indicating the highest degree of correlation as the character set projection system 30 pages through its library. After the library has been exhausted, the character recognition logic 22 has stored therein information relating to the highest degree of correlation and reads this information out to the digital output system 24 such that that circuit may formulate, in a digital output, the determination that the circuitry has made as to the first character in the tire code. The circuitry of the correlator 10 then adjusts the image storage tube such that the reflections from the character set projection system 30 fall upon the second character of the tire code stored on the grid thereof. Again, the character set projection system 30 pages through its library and the correlator 10 compares the characters of the library to the second character of the tire code. The outputs of the correlator 10 again reflect the degrees of correlation and after the library is exhausted the character recognition logic 22 contains therein information regarding the second character of the tire code which is in turn transferred to the digital output system 24. This process is continued until each character of the tire code 9 has been determined. The digital output system 24, which now contains the tire code, may then be accessed by whatever peripheral means are to ultimately use the code.

It should of course be noted that in the third phase of operation as described above a different approach could have been taken to ascertain the characters of the tire code. This approach teaches that a first character is projected by the character set projection system 30 and compared, under the control of the correlator circuitry, to each of the characters of the stored tire code image, the various responses being noted by the character recognition logic 22. The character set projection system 30 would then project a second character from the library and the correlator 10 would compare it with each of the individual characters of the tire code, the character recognition logic 22 then updating the responses for each of these characters. This method would be continued until each of the characters in the library has been compared. Although this approach requires an increase in the amount of logic within the character recognition logic 22, it has the distinct advantage of requiring less operation of the character set projection system 30.

Having acquired a thorough understanding of the basic operation of the instant invention, reference may now be made to FIG. 3 wherein a more detailed illustration of the instant invention may be seen. Here it can be seen that the heart of the system is the Correlatron 40; Correlatron being the trademark owned by Goodyear Aerospace Corporation for certain image storage tubes following the teachings of particular U.S. patents owned thereby including U.S. Pat. Nos. 3,424,937 and 3,476,197. Reference should be had to these patents for a thorough understanding of the operation of the image storage tubes used herein, although certain basic characteristics thereof will be illustrated as this description proceeds.

Again, the operation of the system can be broken down into three particular phases. First, a universal word, similar in nature to the tire code as discussed hereinabove, is reflected into the Correlatron 40 from the Universal Word Projection System 30 by means of the beam splitters 42 and the lens 20. The Universal Word Projection System 30 may be any suitable means such as an illuminated screen containing a universal word. With the universal word contained within the Correlatron 40, the tire 8 bearing the code 9 is started to rotate such that images of the sidewall bearing the code 9 are reflected through a beam splitter 42 and the lens 20 into the Correlatron 40. The output of the Correlatron 40, which represents the correlation function between the universal word and the reflected image, passes through an amplifier 44 and into a phase discriminator 46. The outputs of the phase discriminator 46 which are indicative of the degree of correlation within the Correlatron 40, are fed back through integrating circuits 48 and 50 such that the output of these integrating circuits acting in conjunction with the outputs of the oscillators 52 and 54 affect the characteristic outputs of the deflection circuits 56 and 58 so as to control the nutation of the Correlatron 40. These control concepts associated with the Correlatron 40 are well understood by those skilled in the art and are fully disclosed in prior patents touching upon this art such as U. S. Pat. Nos. 3,638,006; 3,496,290; 3,564,126; 3,423,624; 3,430,092; and 3,476,197. When the tire code 9 is reflected into the Correlatron 40, the output of the amplifier 44, indicating the close correlation within the Correlatron 40, passes through the filter 60 and peak detector 62 and into the comparitor 64. When the output of the peak detector 62, which directly reflects the correlation within the Correlatron 40, reaches or exceeds a predetermined level, Ref. 1, the output of the comparitor 64 indicates to the search indicator 68 that the tire code 9 has been located and is in circumferential registration with the stored image of the universal word. It also indicates to the programmer 66 that radial alignment of the tire must now be achieved. This is accomplished by feeding the output of the radial deflection circuit 58 which, as understood by those skilled in the art, relates to the degree of misalignment in the radial direction, back to a null detector 70 and a comparitor 72. When proper registration has been achieved, the output of the deflection circuit 58 will exceed a predetermined level. Ref. 2, and such will be indicated on the output of the comparitor 72, which informs the programmer 66 that registration has been achieved, and by a null on the null detector 70. Notice should be had to the fact that the null detector 70 and search indicator 68 are means visible to the operator whereby he can realize the degree of correlation within the Correlatron 40 and manually control the position of the tire 8 to achieve registration if such manual control is desirable.

It should be understood, although it is not illustrated in FIG. 3, that the apparatus causing the tire 8 to rotate is contemplated to be driven by a servo mechanism which can readily be controlled by the outputs of the comparators 64 and 72. The adaptation of such a servo mechanism to the instant situation is well understood by those skilled in the art. It can easily be comprehended that a servo mechanism could cause the tire 8 to rotate in a normal fashion until the code was found as indicated by the output of the comparator 64, and then to tilt the tire 8 or the beam splitter 42 until registration was detected in the comparator 72.

With the tire code 9 in direct registration with the previously stored universal word, the Correlatron 40 may be caused to replace the stored universal word by the image of the tire code 9. This is easily achieved and well understood by those skilled in the art. At this point, the characters of the tire code 9 are ready to be compared with the characters contained in the reference character library 74. A staircase generator 76 controls the circumferential deflection circuit 56 so as to progressively focus on different characters of the tire code 9. With the deflection circuit 56 causing incident reflections through the lens 20 to be cast upon the first character of the image of the tire code 9 stored on the storage grid of the Correlatron 40, the stepper motor 80 causes the various characters of the reference character library 74 to be reflected through the lens 20 and onto the first character of the tire code 9 for correlation. It should be understood that the preferred embodiment of the invention contemplates that the reference character library 74 be a disc containing the various characters. As the disc is caused to rotate in steps different characters are projected through the lens 20. The output of the amplifier 44, indicating the degree of correlation, passes through a filter 82 which prevents false signals caused by noise within the system, into the peak detector 84, the output of which is fed to an A/D converter which produces a digital equivalent of the output of the peak detector 84. The memory 88 and the comparator 90 are utilized to continuously update and store outputs of the A/D converter 86 relating to the highest degree of correlation between the reference character and the stored character of the tire code. The output of the comparator 90 affects two circuits. If the output of the A/D converter 86 indicates a higher degree of correlation for any particular comparison than any prior correlation then the output of the comparator 90 causes the output of the A/D converter 86 to replace the date previously stored in the memory 88 relating to the highest degree of correlation previously sensed for that character of the tire code. The output of the comparator 90 will also cause the buffer 92 to receive the digital equivalent of the character of the reference character library 74 resulting in the higher degree of correlation. If the output of the A/D converter 86 does not indicate a higher of correlation than for all other piror comparisons then the output of the comparator 90 so indicates and neither the memory 88 nor the buffer 92 are changed. Consequently, when the entire reference library has been exhausted the character having shown the highest degree of correlation will be ready, after having been properly coded by a code generator 94 to be transferred to a teletype 96 or other peripheral apparatus. After the first character of the tire code 9 has been determined, the staircase generator 76 advances to the next step such that the circumferential deflection circuit 56 causes the Correlatron 40 to focus reflections through the lens 20 upon the second character of the tire code 9 and the process is repeated. The entire process is repeated until all characters of the tire code 9 have been determined and made available for use by the teletype 96 or other peripheral equipment.

Of course, as mentioned hereinabove, the manner in which the various characters of the tire code are determined might be slightly altered. It should be readily understood that by increasing the size of the memory 88 and the buffer 92 and by controlling the addressing of the storage elements of the memory 88 and the buffer 92 in accordance with the level of the staircase generator 76 by means of an A/D converter or the like, it is possible to correlate each of the characters of the tire code with one character of the reference library, store the results of those correlations in the memory 88, step to the next character in the reference library and compare it with each of the characters of the tire code and update the contents of the memory 88 and buffer 92, continuing this process until each of the characters of the tire code has been compared with all of the characters of the reference character library 74. When all the comparisons have been made, the memory 88 and buffer 92 will contain information relating to the complete tire code for readout to the teletype 96 or other peripheral equipment. It should be understood that this approach is basically the same as the approach of determining one character of the tire code at a time but it requires less paging through the reference character library 74. This latter approach however does require a larger memory 88 and buffer 92. Provisions for this latter approach may be easily achieved by one skilled in the art.

Still another approach toward achieving the determination of the tire code which is quite similar to the approach described in the immediately preceding paragraph may be readily conceived. This approach requires a number of memories 88, comparators 90 and buffers 92 equivalent to the number of characters in a tire code and a simple gating network operating in conjunction with the staircase generator 76. The level of the staircase generator 76 indicates the character of the tire code being operated on and consequently gates into operation the memory, comparator and buffer associated with the particular character. Each time a particular circuit is gated into operation the circuit updates itself such that after the character reference library 74 has been exhausted the buffers 92 contain the complete tire code. It should be easily seen that this approach is very nearly the same as that of the previous paragraph but for the fact that this approach teaches an increase in the number of identical circuits while the former teaches an increase in the size of a single circuit with the addition of an addressing means.

It should be noted that while the characters of the reference character library 74 are being compared with the particular characters of the tire code 9 within the Correlatron 40, nutation is understood by those skilled in the art. The provision for nutation has been made such that absolute registration of the image of the tire code 9 within the Correlatron 40 and the various reflected images of the characters of the reference character library 74 will not be critical. The provision for nutation guarantees that the images from the reference character library 74 will sufficiently align with the images of the tire code 9 to effect a reliable output from the amplifier 44. provided for by means of the oscillators 52 and 54 and the deflection circuits 56 and 58. As mentioned above, this nutation is well The filters 60 and 82 are of a characteristic frequency equivalent to the sum of the oscillators 52 and 54. That is, if oscillator 52 would be 1 Khz and oscillator 54 would be 5 Khz then filters 60 and 82 would be 6 Khz filters so as to allow the passage of the correlation function signals from the Correlatron 40 but to filter out any noise generated within the system.

It should become readily apparent that certain conflicts will arise when using the Correlatron 40 to determine the characters of the tire code. For example, if the tire code character which is being compared with the various characters of the character reference library is an I, then the output of the Correlatron 40 will be the same in both instances when compared with a T or an I from the character reference library. That is, one skilled in the art would understand that with an I stored on the storage grid of the Correlatron 40, and the same electron flow will be experienced within the Correlatron when the incident image is either a T or an I. Therefore, certain additional circuitry is necessary to resolve the conflicts. Such circuitry is easily developed, well understood by those skilled in the art, and included in the preferred embodiment of the invention. The circuitry would operate such that if a conflict develops by virtue of the A/D converter 86 giving identical outputs for both a T and I from the reference character library 74 then the circuitry would resolve the conflict in favor of the I. The circuitry is readily extendable to cover any of numerous conflicts, the conflicts indicating particular characters.

So it can be seen that the objects of the instant invention have been achieved by the above disclosed apparatus and method. While in accordance with the Patent Statutes only the best known and preferred embodiment of the invention has been disclosed, the invention is not limited thereto or thereby. Therefore, reference should be had to the appended claims in determining the true scope of the invention.

What is claimed is:

1. The method of determining a particular code upon a given item, the code containing a plurality of characters comprising the steps of:

a. storing the image of a universal word upon the storage grid of an image storage tube:

b. passing the portion of the item containing the particular code before the storage tube in such a manner as to cast an image of that portion of the item onto the storage grid of the image storage tube, the output of the storage tube indicating the degree of correlation between the image of the stored universal word and the image of the portion of the item;

c. stopping the passing of the portion of the item containing the particular code before the storage tube at that position where the output of the image storage tube indicates the higest degree of correlation;

d. replacing the stored image of the universal word on the storage grid with the image of the particular code;

e. serially reflecting the images of all the various characters of which the particular code may be comprised upon each of the individual images of the characters of the particular code on the storage grid so as to effect correlation functions at the output of the image storage tube; and f. sensing the output correlation functions of the data storage tube so as to detect the highest degree of correlation for each character of the particular code, the highest degree of correlation indicating that the character of the particular code is that character which, when its image was reflected onto the image of the character of the particular code, resulted in the highest degree of correlation.

2. The method according to claim 1 wherein the various images are reflected into the image storage tube by means of a system of beam splitters and a reflecting lens.

3. The method according to claim 1 wherein the passing of the portion of the item containing the particular code before the image storage tube and the stopping of the passing is managed by a servo mechanism which is controlled by the output of the image storage tube.

4. The method according to claim 1 wherein steps (e) and (f) are accomplished in such a manner as to serially correlate within the image storage tube the images of all the various characters of which the particular code may be comprised with the image of a single character of the particular code on the storage grid so as to determine from the output correlation function the identity of that single character and then repeating this procedure for the next single character of the particular code and so on until each of the individual characters of the particular code has been identified.

5. The method according to claim 1 wherein steps (e) and (f) are accomplished in such a manner as to serially correlate one of the various characters of which the particular code may be comprised with all of the characters of the particular code and, after storing the information regarding the degree of correlation with regard to each of the characters of the particular code, correlating the next of the various characters of which the particular code may be comprised with all of the characters of the particular code and using the results of this correlation to update the stored information regarding the previous correlations and so on until each of the characters of which the particular code may be comprised has been compared with all of the characters of the code, at which time the stored information will reflect the identity of the particular code.

6. Apparatus for determining a particular code upon a given item, the code containing a plurality of characters, comprising:

an image storage tube and control circuitry associated therewith providing a means of sensing, storing, and comparing optical images:

an optical means operatively positioned in front of the tube for reflecting optical images into the image storage tube;

a universal word projection system optically aligned with the storage tube for reflecting an image of a universal word through the optical means and upon the image storage tube such that the particular code may be aligned therewith; and a reference character set projection system optically aligned with the storage tube for reflecting the image of each of a plurality of reference characters upon the image storage tube so as to effect an output of the image storage tube which is a function of the correlation between the reference character and the individual characters of the particular code.

7. The apparatus according to claim 6 wherein the image storage tube comprises a magnetically focused and deflectable image storage tube.

8. The apparatus according to claim 6 which includes means connected to the image storage tube for receiving, storing and updating the outputs of the image storage tube such that when any character of the particular code has been correlated with each of the characters of the reference character set projection system the identity of that character is determined and contained in said means for receiving, storing and updating.

9. The apparatus according to claim 6 wherein said control circuitry includes a staircase generator connected to a deflection circuitry, for selecting the particular character of the code which is to be determined.

10. The apparatus according to claim 6 which includes means for passing the given item before the image storage tube so that the image of the code may be reflected into the image storage tube.

11. The apparatus according to claim 10 which includes a source of illumination so positioned with respect to the means to pass the given item before the image storage tube that a sharp contrast is created between the particular code and the given item.

* * * * *